United States Patent Office.

HENRI SCHMID, OF MÜLHAUSEN, GERMANY, ASSIGNOR TO THE FARBWERKE, VORMALS MEISTER, LUCIUS & BRÜNING, OF HÖCHST-ON-THE-MAIN, GERMANY.

PROCESS OF DISCHARGING RED.

SPECIFICATION forming part of Letters Patent No. 598,118, dated February 1, 1898.

Application filed June 4, 1896. Serial No. 594,196. (No specimens.)

*To all whom it may concern:*

Be it known that I, HENRI SCHMID, chemist, a citizen of the Swiss Confederation, residing at Mülhausen, in the Empire of Germany, have invented certain new and useful Improvements in Processes of Discharging Paranitranilin-Red Fabrics, White and Colored, and Manufacturing a Discharging Color Therefor, of which the following is a specification.

Of the insoluble azo dyes heretofore produced the so-called "paranitranilin-red" has been largely employed in printing and dyeing on account of its fastness and brilliant tints.

In those cases in which brilliancy of color, simplicity of method, and a low price, together with fastness, are essential, the paranitranilin-red may be substituted in many instances for alizarin-red, if sufficiently fast, thus largely reducing the application of the direct red cotton dyestuffs. In many cases, however, a preference still exists for the latter dyestuffs, being more easily discharged. It was impossible up till now to discharge the insoluble azo dyes produced on the fiber thoroughly white and the so-called "discharging substances" had to be replaced by the resisting style, which again had the disadvantage of not producing a pure and always equally good discharging white nor to produce colored discharges fast to soap.

I have discovered that paranitranilin-red may be easily discharged in white and even in colors, when to the discharging color containing a tin-salt, such as used up till now, substances are added which dissolve the paranitranilin-red. The red, temporarily dissolved in steam, is thus easily reduced by the tin-salt in its products of reduction, paraphenylen diamin and amidonaphthol, which may be easily removed by subsequent washing. By means of appropriate concentration and composition of the discharging colors the formation of hydrocellulose, and consequently the corrosion of the cotton fiber, can be avoided. As substances best suited for my purpose I mention glycerin, acetin, chlorhydrin, and the glycerids of other equally-fixed organic acids or mixed acids, like tartracetin, &c., levulin acid and the difficultly-volatilizing alcohols and their esters.

The process discovered by me is as follows: A tin-salt discharging color is printed on paranitranilin-red, which contains from fifty to one hundred and fifty grams of one of the above-mentioned solvents, as well as acetates and citrates of ammonium or of an alkali to insure against corrosion of the fiber while a thickening, such as wheat-starch, dextrine, and gum is added. After printing and dyeing the fabric is steamed and passed through hot water, well washed, and then the printed stuffs are passed through a slightly-acid and strongly-diluted solution of bleaching-powder. Drying with chlorin on the cans serves the same purpose.

The operation of treating with chlorin is not intended to clean the parts discharged with white, but to vivify and reproduce the red color, if it should appear brown through steaming. The original beauty of the red is again obtained after the treatment with chlorin.

By the addition of dyestuffs which easily support the action of discharges and which under the present conditions are easily fixed (such as Persian berries, with or without addition of anilin colors, &c.) it is not difficult to obtain colored discharges. They can likewise be produced by previously preparing the fabric with tannin and printing thereupon the anilin dyestuffs mixed with tin-salt discharges or by printing thereupon tannin colors mixed with a discharging agent. A further advantage results by the application of paranitranilin-red from the fact that the described white and colored discharges reduce sufficiently so as to avoid the formation of the overprinted anilin-black without damaging the purity of the red discharges and to preserve white and other colored patterns pure under the mordants of black.

It is evident that the white or colored discharges permit at the same time the printing of anilin-black, the latter being easily composed so as to become fixed under the same conditions of steaming.

Having thus described my invention, I desire to claim as new the following:

1. The process of discharging paranitranilin-red, which consists in printing on the paranitranilin-red a discharging color containing a tin-salt and acetin, having a dissolving action upon the red, and permitting the discharge to act in the usual manner by steaming, substantially as described.

2. As a new product, a discharge for paranitranilin-red, containing a tin-salt and acetin, having a dissolving action on the paranitranilin-red, substantially as set forth.

In testimony that I claim the foregoing as my invention I have signed my name in presence of two subscribing witnesses.

HENRI SCHMID.

Witnesses:
GEORGE GIFFORD,
CASIMER SWENHAUS.